March 24, 1970 J. O. WOOD 3,502,525
METHODS AND APPARATUS FOR MANUFACTURING
RUBBERIZED TEXTILE FABRIC
Filed July 13, 1966 3 Sheets-Sheet 2

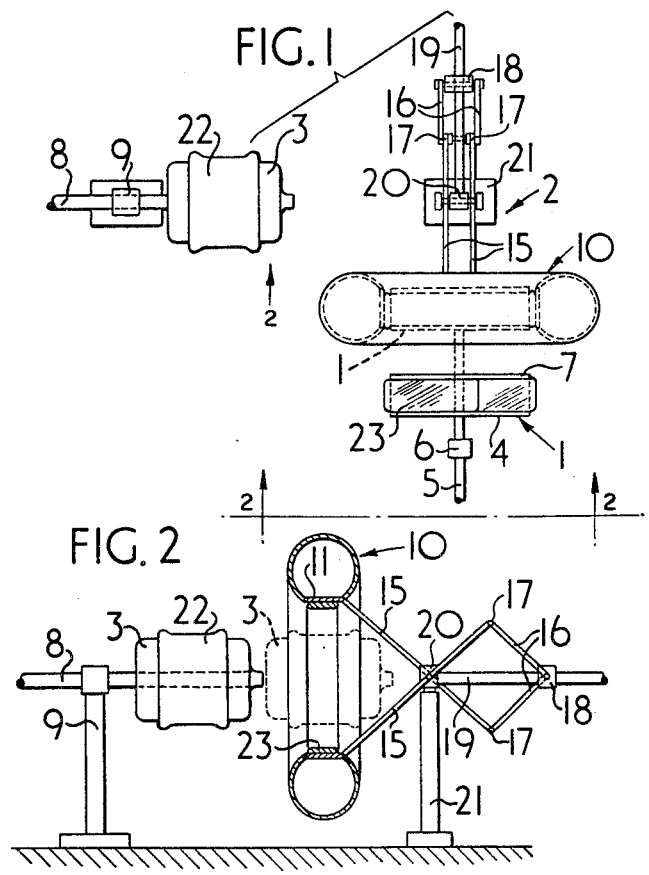

March 24, 1970  J. O. WOOD  3,502,525
METHODS AND APPARATUS FOR MANUFACTURING
RUBBERIZED TEXTILE FABRIC
Filed July 13, 1966  3 Sheets-Sheet 3
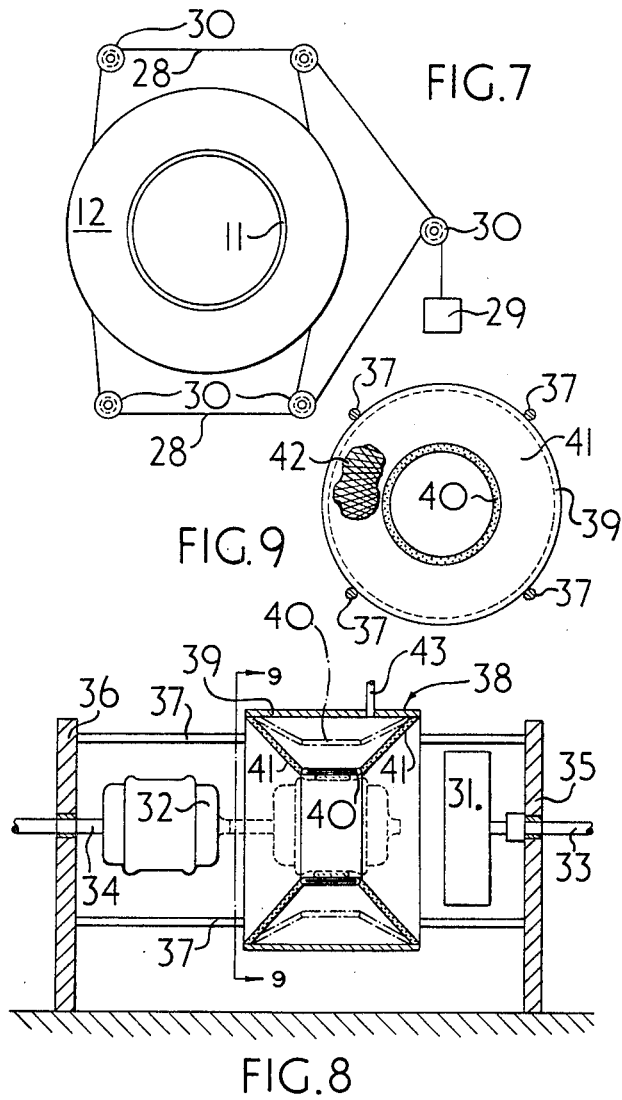

United States Patent Office 3,502,525
Patented Mar. 24, 1970

3,502,525
METHODS AND APPARATUS FOR MANUFACTURING RUBBERIZED TEXTILE FABRIC
John Oswald Wood, Tamworth, England, assignor to The Dunlop Company Limited, London, England, a British company
Filed July 13, 1966, Ser. No. 564,812
Claims priority, application Great Britain, July 17, 1965, 30,477/65
Int. Cl. B29h 17/36, 17/08, 5/02
U.S. Cl. 156—111          15 Claims

ABSTRACT OF THE DISCLOSURE

Method and apparatus for longitudinally compressing the cord in an unvulcanized rubberized parallel cord fabric for use in the construction of pneumatic tires and the like, which consists of forming the fabric into an annulus, positioning the annulus within an annular member, and the reducing the radially inner diameter of the annular member to reduce the diameter of the fabric annulus and thereby compressing the cords therein.

---

This invention relates to methods and apparatus for manufacturing rubberised textile fabric and more particularly the application of said methods and apparatus to the manufacture of pneumatic tires.

According to the invention there is provided a method of longitudinally compressing the filaments of an unvulcanised rubberised textile filamentary material wherein a plurality of textile filaments are located side-by-side in substantially parallel relationship which comprises forming an annulus of said fabric, removably securing said annulus of fabric radially within an annular member, and reducing the radially inner diameter of said annular member to reduce the diameter of said annulus and compress the filaments.

Preferably the annular member defines the radially inner portion of an inflatable toroidal member and the method includes the step of altering the internal pressure within the toroidal member with respect to ambient pressure to reduce the diameter of the annular member.

The invention also includes a method of manufacturing a pneumatic tire comprising longitudinally compressing the filaments of an unvulcanised rubberised textile filamentary fabric by a method as defined in the preceding paragraphs including the step of locating the annulus of fabric coaxially around a carcass for a pneumatic tire to form a breaker, and inflating the carcass into the toroidal shape of a finished tire.

Preferably the carcass is in substantially cylindrical form before inflation thereof and the method includes the steps of reducing the diameter of the annulus from the diameter it occupies in the finished tire to substantially the diameter of the uninflated carcass. Alternatively, the method comprises reducing the diameter of the annulus from a diameter greater than that it occupies in the finished tire to substantially the diameter of the uninflated carcass.

The invention further includes apparatus for compressing the filaments of an unvulcanised rubberised textile filamentary fabric which comprises a plurality of textile filaments located side-by-side in parallel relationship comprising an annular member in the form of a hollow cylinder of resilient material reinforced with substantially inextensible and incompressible cords extending substantially axially of the cylinder and means for changing the diameter of the cylinder from a relaxed condition to a condition in which the cylinder has an increased diameter and is in a tensioned condition circumferentially of the cylinder.

Preferably the means for expanding the cylinder comprises an outer casing extending, as viewed in axial cross-section, from one end of the cylinder to the other end to form an inflatable toroidal member of which the cylinder defines the radially inner portion, the casing being reinforced with at least two cross-biased cord plies, the cords making an angle with the circumference such that, on pressurisation of the toroidal member, the member expands and the diameter of the cylinder is thereby caused to increase. Alternatively, the means for expanding the cylinder comprises a rigid outer hollow cylindrical member having a diameter greater than the diameter of the annular member and a pair of annular diaphragms, each of said diaphragms extending between and secured to one end of the annular member and to an end of the rigid member adjacent to said end of the annular member to form a toroidal member, and means for connecting the interior of said toroidal member to a source of vacuum.

The invention further includes apparatus for the manufacture of pneumatic tires comprising apparatus as defined in any of the preceding paragraphs, a breaker building former, a tire building former, and means for relatively moving the formers and the said apparatus into a position in which the annular member surrounds the breaker building former and a position in which the annular member surrounds the tire building former.

Still further the invention includes a pneumatic tire when manufactured according to a method as defined above, and a pneumatic tire in the manufacture of which apparatus as defined above is used.

Embodiments of the invention will now be described, by way of example, with reference to the accompanying substantially diagrammatic drawings in which:

FIGURE 1 is a plan view of apparatus for manufacturing a pneumatic tire according to the present invention which incorporates apparatus for compressing fabric also according to the present invention.

FIGURE 2 is an elevation view looking in the direction of the arrows 2—2 in FIGURE 1 partly in section, of the apparatus of FIGURE 1 showing the apparatus adjusted to undertake a subsequent step of the method according to the present invention.

FIGURE 7 is a view on line 7—7 of FIGURE 6.

FIGURE 8 is a sectional view of a further embodiment of apparatus for the manufacture of a pneumatic tire, according to the invention, FIGURE 9 is a side elevational view on line 9—9 of FIGURE 8 partly in section of a second toroidal member according to the invention.

Figure 3:
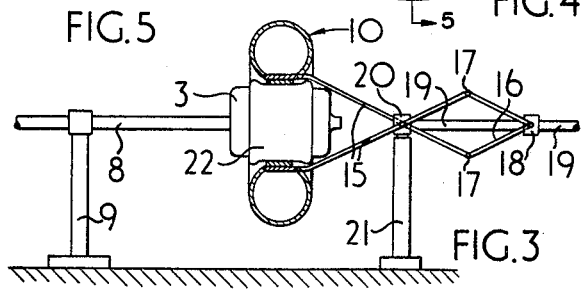
FIGURE 3 is a similar view to that of FIGURE 2 showing a further stage in the method according to the invention.

Apparatus for the manufacture of a pneumatic tire shown in FIGURES 1, 2 and 3 comprises a breaker building former 1, a breaker transferring and compression device 2, and a tire building former 3, mounted in a common horizontal plane.

The breaker building former 1 comprises a hollow metal cylinder having one end open. The other end is closed by an integral metal disc 4 forming an extension of a shaft 5 which is rotatably mounted in a pedestal 6.

The radially outer peripheral surface 7 of the former forms a breaker building surface and has a diameter substantially equal to the diameter of the breaker in the finished tire.

The tire building former 3 is of known flat band type such as that described in the complete specification of U.K. patent application No. 25,214/62 in the use of which tire carcass layers are positioned about an inflatable diaphragm in cylindrical form, bead wires are positioned about the carcass layers and the ends of the layers turned over the bead wires by ply turn over means and the diaphragm is inflated to shape the carcass into toroidal form. The tire building former 3 is secured to a second shaft 8 which is rotatably mounted in a second pedestal 9 so that the axis of the two shafts 5 and 8 lie in the same horizontal plane but at right angles to each other.

The breaker transferring and compressing device 2 comprises an apparatus 10 for compressing fabric, and transferring means for positioning the apparatus 10 both in a position shown in broken lines in FIGURE 1 to remove a fabric in the form of a breaker from the breaker building former and positions shown in FIGURES 2 and 3 to transfer the fabric to a carcass mounted on the tire building former.

Figures 4, 5:
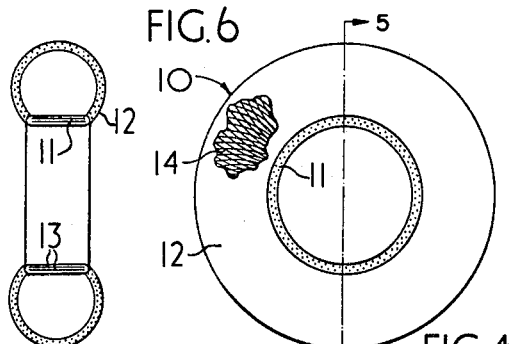
FIGURE 4 is a side elevational view partly in section of a first toroidal member according to the invention.
FIGURE 5 is a view on line 5—5 of FIGURE 4.

The apparatus 10 comprises an inflatable toroidal member and is particularly shown in FIGURES 4 and 5, It consists of two parts, a radially inner substantially cylindrical part 11 and a radially outer part 12 which when viewed in cross-section extends from one end to the other and radially outwardly of the inner part 11 as shown in FIGURE 4. The radially inner part constitutes an annular member and comprises a cylinder of vulcanised rubber of substantial thickness reinforced with two layers 13 of steel wires which extend from one end of the cylinder to the other in a direction substantially parallel to the axis of the cylinder. This part is thus radially extensible, but axially inextensible. Further the walls of the cylinder do not tend to bulge radially inwardly under pressure because of the provision of the plurality of layers of steel wires, i.e. the cylindrical nature of the inner part is maintained throughout its radial expansion. In its relaxed condition the cylinder has an internal diameter slightly less than the diameter of a carcass 22 mounted on the flat band tire building former 3. It is radially expansible to a diameter greater than the diameter of the breaker building former 1. The thickness of the cylinder is such that the forces generated by stretching the cylinder are sufficient to compress the breaker fabric when the fabric is applied to the inner surface of the stretched cylinder and the cylinder allowed to contract.

The radially outer part 12 of the toroidal member is a casing comprising layers 14 of parallel cord textile fabric. The cords in one layer extend in the opposite direction to the cords in an adjacent layer. The bias angle of the cords are chosen so that, on inflation of the member to a given pressure, the cords rotate with respect to a circumferential line of the bag to a new equilibrium position. In the new equilibrium position the inner cylinder has a diameter slightly larger than the external diameter of the breaker mounted on the breaker building former.

In the construction of a toroidal member, for example, where a radial expansion of 70% is required and the cylinder is required to exert a peripheral recovery force of 112 lbs. of each 10% of its extension, the initial bias angle is chosen to be 70° with respect to a circumferential line and the final bias angle 53° on inflation of the member to a pressure of 50 p.s.i. To give the casing sufficient strength 4 plies are required in the radially outer part, each ply containing 25 cords per inch at 30 lbs. per cord breaking strength. The cords in each ply extend in the opposite sense with respect to the circumferential line to the cords in adjacent plies. At the junction of the inner and outer parts the cords in the plies are distorted so that they extend axially of the inner part.

Means not shown are provided for inflating the bag in the form of a pipe connection molded into the casing and connected by means of a two-way valve to air pressurising means and atmosphere.

The transferring means is provided for maintaining the bag in correct radial and axial location with respect to the breaker building former or tire building former during radial expansion and contraction of the inner cylinder and for moving the toroidal member between a position in which it can surround the breaker building former and a position in which it can surround the tire building former. The transferring means consists in a trellising system of arms of which the ends of each of a first pair 15 of arms of identical length are pivotally attached to diametrically opposed points on the end of the cylinder 11 remote from the breaker building former. The other ends of the first pair of arms are pivotally attached at 17 one to each of a second pair 16 of arms at the ends thereof. The other ends of the second pair 16 of arms are pivotally attached to a first sleeve 18 which is slidable on a third shaft 19. The second pair of arms have equal lengths which are approximately half of the lengths of the first pair of arms. The mid points of the first pair 15 of arms are pivotally attached at a common pivot point on a second sleeve 20 keyed to an end of a third shaft 19. The sleeve 20 is rotatably mounted for rotation in a horizontal plane on a pedestal 21. The rotational axes of the shafts 5, 8 and 19, and the axes about which the sleeve 20 and arms 15 pivot intersect at a common point.

Thus, relative axial movement of the ends of the first pair of arms attached to the cylinder is not possible. Similarly radial movement of the said ends of the first pair of arms can only be of the same magnitude and in opposing directions.

In use of the apparatus in the manufacture of a pneumatic tire a carcass 22 is built upon the tire building former 3 in known manner. Briefly the inner liner and carcass layer of textile fabric are wrapped about the cylindrical building surface, bead wires are located in position about the layers and the ends of the layers lying axially outwardly of the bead wires are turned axially inwardly over the bead wires. The carcass layers thus have a substantially cylindrical form of diameter substantially equal to the bead wire diameter. The cords of the carcass layers extend at substantially 90° to the circumferential line of the carcass.

A strip 23 of parallel cord fabric is wrapped about the outer peripheral surface of the breaker building former to form an annular breaker. The cords extend at a low bias angle with respect to a circumferential line, that is of the order of 15°.

The toroidal member is inflated to increase the inner cylinder 11 to a maximum diameter and to move the first sleeve 18 axially towards the second sleeve 20. The breaker building former 1 is moved axially along the first shaft 5 to a position in which the inner cylinder of the air bag surrounds the former as shown in dotted outline in FIGURE 1. Slight deflation of the toroidal member causes a small reduction of the diameter of the cylinder to bring the radially inner surface of the cylinder into intimate contact with the breaker layer.

The toroidal member is fully inflated again to increase the diameter of the cylinder. Since there is greater adhesion between the vulcanised rubber of the cylinder and the breaker than between the breaker and to metallic surface of the former the breaker adheres to the cylinder rather than to the former.

The breaker building former is moved away from the toroidal member and the apparatus 10 for compressing fabric is rotated through 90° to a position coaxial with the axis of the tire building former 3 as shown in full outline in FIGURE 2. The building former is then moved axially to a position within the toroidal member as shown in dotted outline in FIGURE 2.

The interior of the toroidal member is connected to atmosphere and the member allowed to deflate at a controlled rate to cause the inner cylinder to contract radially to place the breaker on the carcass in the position shown in FIGURE 3. During deflation of the toroidal member the first sleeve 18 moves axially away from sleeve 20 to allow each of the ends of the arms 15 secured to the cylinder to move radially inwardly at the same rate.

During contraction of the cylinder the breaker cords are compressed to reduce the peripheral length of the breaker so that it is the same as the peripheral length of the radially outermost surface of the carcass. When the breaker is in intimate contact with the carcass the cords make an angle of the order of 25° with respect to a circumferential line of the carcass. Since the cylinder is reinforced so that it has a substantially constant axial dimension the width of the breaker layer remains constant during the compression of the cords.

The interior of the toroidal member is then connected to the air pressurising means and the member reinflated. The breaker now remains in contact with the carcass since the adhesion between two layers of unvulcanised rubber is greater than the adhesion between one layer of vulcanised and one layer of unvulcanised rubber.

The toroidal member is now rotated to the position shown in FIGURE 1 and tread and sidewall rubbers added to the carcass.

The diaphragm of the tire building former is inflated, shaping the flat built tire into toroidal form and increasing the diameter of the breaker until in the finished shape of the tire the cords of the breaker are substantially uncompressed and have a bias angle of 15° approximately. The tire is now removed from the former and molded and vulcanized in known manner.

Figure 6:
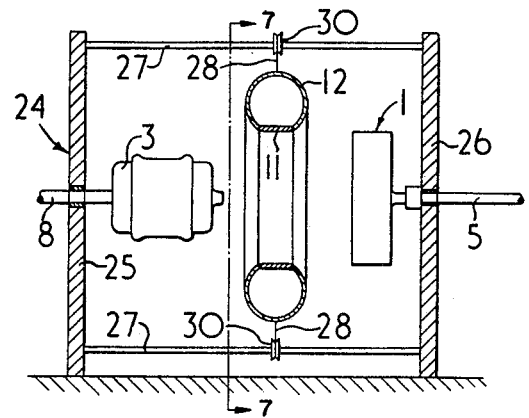
FIGURE 6 is a sectional view of a further embodiment which is a modification of the apparatus indicated in the embodiment of FIGURES 1–5 for manufacturing pneumatic tires according to the invention.

In a modification of the first embodiment shown in FIGURES 6 and 7 the tire building former 3, the breaker building former 1, and the apparatus 10 for compressing fabric are mounted coaxially. A framework 24 has end frames 25 and 26. The shaft 8 on which the tire building former 3 is rotatably mounted is slidably received in the end frame 25. The shaft 5 on which the breaker building former 1 is rotatably mounted is slidably received in end frame 26. Four shafts 27 connect the end frames together.

Cords 28 are attached each by one end to each of four points equally spaced about the outer peripheral surface of the radially outer part 12 of the toroidal member. The other ends of all four cords are attached to a single weight 29. The attachment points on the part 12 lie at the ends of diameters of the toroidal member which extend at 45° to the vertical diameter and the cords pass from these points around pulleys 30 so that the weight applies equal tension in each of the cords. Also when the system is static the toroidal member lies coaxially with the shafts 5 and 8. The forces created in the part 12 during inflation and deflation are sufficient to overcome the forces due to the weight and to allow the radially inner part 11 to contract radially to compress a fabric breaker layer. The breaker building former 3 and the tire building former 1 are movable on their shafts to positions axially and radially within the apparatus 10.

The apparatus of a second embodiment of the invention shown in FIGURES 8 and 9 comprises a breaker building former 31 and a tire building former 32 rotatably mounted respectively on shafts 33 and 34 respectively slidably mounted in end frames 35 and 36 as in the modification of the first embodiment. A breaker transferring and compressing means is located co-axially with the formers between the end frames by connecting members 37.

The breaker transferring and compressing device comprises a toroidal member 38 having a radially outer cylinder 39, radially inner cylinder 40, and a pair of annular diaphragms 41, which, when viewed in cross-section, connect the ends of the two cylinders.

The outer cylinder 39 is rigidly formed of metal and has a diameter larger than the diameter of the breaker building former 31. The inner cylinder 40 forms an annular member and is constructed substantially as the inner cylinder of the toroidal member of the first embodiment. It consists of a cylinder of vulcanised rubber reinforced with parallel steel wires extending axially of the cylinder. The inner cylinder has an axial length of approximately half of the axial length of the outer cylinder and substantially equal to the width of a breaker layer. In its relaxed condition the inner cylinder has a diameter substantially equal to the diameter of the tire building former in its cylindrical condition. The inner cylinder is radially extensible to a diameter slightly less than the diameter of the outer cylinder in which condition it has a diameter greater than that of the building surface of the breaker former as shown in chain-dotted lines in FIGURE 8.

Each annular diaphragm 41 is in the form of a hollow frustum of a cone and has its radially outer edge bonded to the rigid outer cylinder and its radially inner edge bonded to the inner cylinder. Each diaphragm consists of a pair of cross-biased plies 42 comprising substantially air-impervious rubberised parallel cords. The cords have a bias angle with respect to a circumferential line such that the cord length remains substantially constant in the relaxed and expanded position of the inner cylinders. The required angle is determined from the relation $$\cos\theta = \frac{r_1 + r_2}{2r_2}$$

where $r_1$ and $r_2$ are the radii of the inner cylinder in the relaxed and fully expanded conditions and $\theta$ is the angle subtended at the cylinder axis by the two ends of any one cord when viewed normal to the cylinder axis. The ends of the cords bonded to the inner cylinder are distorted so that they extend axially of the inner cylinder.

A connection 43 is made in the outer cylinder to connect the interior of the device to a pipe not shown connected by means of a three-way valve to air pressure reducing means, atmosphere, and air pressurising means.

On operation carcass layers and a breaker layer are wrapped around respectively the tire building former 32 and breaker building former 31 in the same manner as in the first embodiment. The interior of the toroidal member 38 is connected to air pressure reducing means, the pressure differential with respect to ambient atmospheric pressure causing the inner cylinder 40 to expand radially to maximum dimension. The breaker building former 31 is moved axially to a position where it is disposed within the inner cylinder and symmetrically therewith. The interior of the toroidal member 38 is then connected to atmosphere allowing the inner cylinder to contact into intimate contact with the breaker layer.

The interior of the member 38 is then reconnected to pressure reducing means to remove the annulus from the former and the breaker building former removed axially from the member 38 and the tire building former moved axially into a position symmetrically disposed with respect to the breaker layer as shown in dotted lines in FIGURE 8. The interior of the member is again connected to atmosphere allowing the inner cylinder to relax once more to longitudinally compress the filaments of the breaker layer and place the breaker layer in contact with the carcass layer. If required the interior of the bag may be connected to air pressurising means, by adjusting the three-way valve, to more firmly press the breaker layer into contact with the carcass layers.

The interior of the member is reconnected to air pressure reducing means to expand the inner cylinder once again. As explained previously since there are different adhesive properties between the various components the breaker layer is transferred from the breaker building former onto the carcass mounted on the tire building former.

A second compressed breaker is compresed into the carcass in the same manner as the first breaker layer and the tire building former removed from within the toroidal member. Tread and sidewall rubbers are added and the tire shaped and vulcanised and molded in known manner.

In a modification of the above embodiments a tire may be constructed in which the cords in the breaker layer are compressed in the final shaped, molded, and vulcanised, tire. In this case the inner cylinder in each embodiment in the relaxed condition has a diameter substantially equal to the diameter of the breaker in the finally shaped tire and the breaker building former has a diameter proportionally larger. The breaker is transferred in a compressed state onto a pre-shaped carcass. Alternatively the breaker layer may be compressed from a diameter larger than the diameter of the layer in the finally shaped tire into contact with a carcas in a substantially cylindrical condition. Although the present invention has been illustrated and described in connection with certain selected example embodiments it will be understood that these are illustrative of the invention and are by no means restrictive thereof. It is reasonably to be assumed that those skilled in this art can make numerous revisions and adaptations of the invention.

Having now described my invention, what I claim is:

1. A method of longitudinally compressing the filaments of an unvulcanised rubberised textile filamentary fabric which comprises a plurality of textile filaments located side-by-side in substantially parallel relationship comprising forming an annulus of said fabric, removably securing said annulus of fabric radially within an annular member, and reducing the radially inner diameter of said annular member to reduce the diameter of said annulus and compress the filaments.

2. A method according to claim 1 wherein said annulus of fabric is formed by wrapping said filaments around a cylindrical building former and said annular member is placed around said former and the diameter thereof is reduced to bring the radially inner surface of the member into contact with the fabric to removably secure the annulus to the member.

3. A method according to claim 1 wherein the annular member defines the radially inner portion of an inflatable toroidal member and the method includes the step of altering the internal pressure within the toroidal member with respect to ambient pressure to reduce the diameter of the annular member.

4. A method according to claim 1 including controlling the radial movement of the annular member so as to maintain the axis thereof in a substantially constant position during said radial movement.

5. A method of manufacturing a pneumatic tire comprising longitudinally compressing the filaments of an unvulcanised rubberised textile filamentary fabric by a method according to claim 1 including the step of locating the annulus of fabric coaxially around a carcass for a pneumatic tire to form a breaker, and inflating the carcass into the toroidal shape of a finished tire.

6. A method of manufacturing a pneumatic tire according to claim 5 wherein the carcass is in substantially cylindrical form before inflation thereof and the method includes the step of reducing the diameter of the annulus from the diameter it occupies in the finished tire to substantially the diameter of the uninflated carcass.

7. A method of manufacturing a pneumatic tire according to claim 5 comprising reducing the diameter of the annulus from a diameter greater than that it occupies in the finished tire to substantially the diameter of the uninflated carcass.

8. Apparatus for longitudinally compressing the filaments of an unvulcanized rubber textile filamentary fabric having a plurality of textile filaments located side-by-side in substantially parallel relationship, comprising: an annular member forming a hollow cylinder of resilient material reinforced with substantially inextensible and incompressible cords extending substantially axially of the cylinder, and means for changing the diameter of the cylinder from a relaxed condition to a tensioned condition circumferentially of the cylinder, said cylinder being proportioned to receive the said fabric within the radially inner surface thereof in the expanded tensioned condition of said cylinder whereby, upon decreasing the diameter of the cylinder, the textile filaments of said fabric are longitudinally compressed.

9. Apparatus according to claim 8 wherein said cords are of steel and are disposed in two layers, one layer being radially inwardly of the other layer.

10. Apparatus according to claim 8 wherein the means for expanding the cylinder comprises an outer casing extending, as viewed in axial cross-section, from one end of the cylinder to the other end to form an inflatable toroidal member of which the cylinder defines the radially inner portion, the casing being reinforced with at least two cross-biased cord plies, the cords making an angle with the circumference such that, on pressurisation of the toroidal member, the member expands and the diameter of the cylinder is thereby caused to increase.

11. Apparatus according to claim 8 wherein means are provided for controlling the radial movement of the cylinder so as to maintain the axis thereof in a substantially constant position during said radial movement.

12. Apparatus according to claim 11 wherein said controlling means comprises a trellising system of arms consisting of a first pair of arms pivotally mounted together at the mid points thereof and on the said axis of the cylinder and having their first ends secured to the cylinder and their other ends pivotally secured one to each of an end of a second pair of arms, the other ends of which are constrained to move along the said axis.

13. Apparatus according to claim 8 wherein the means for expanding the cylinder comprises a rigid outer hollow cylindrical member having a diameter greater than the diameter of the annular member and a pair of annular diaphragms, each of said diaphragms extending between and secured to one end of the annular member and to an end of the rigid member adjacent to said end of the annular member to form a toroidal member, and means for connecting the interior of said toroidal member to a source of vacuum.

14. Apparatus according to claim 13 wherein each diaphragm is constructed of a pair of cross-biased plies comprising substantially air-impervious rubberised parallel cords.

15. Apparatus for the manufacture of pneumatic tires comprising apparatus as defined in claim 8, a breaker building former, a tire building former and means for relatively moving the formers and the said apparatus into a first position in which the annular member surrounds the breaker building former and then in a second position in which the annular member surrounds the tire building former.

References Cited

UNITED STATES PATENTS

| | | | |
|---|---|---|---|
| 2,517,889 | 8/1950 | Kuffler | 156—126 |
| 2,703,128 | 3/1955 | Darrow | 156—124 X |
| 2,822,027 | 2/1958 | Hollis | 156—127 |
| 2,871,912 | 2/1959 | Kraft | 156—126 |
| 3,070,478 | 12/1962 | Riddle | 156—126 |
| 3,192,087 | 6/1965 | Close et al. | 156—126 |
| 3,332,820 | 7/1967 | Porter | 156—394 |
| 3,144,374 | 8/1964 | Saint Paul | 156—416 |
| 3,434,897 | 3/1969 | Caretta et al. | 156—412 X |
| 3,441,074 | 4/1969 | Pouilloux et al. | 156—416 |

HAROLD ANSHER, Primary Examiner

U.S. Cl. X.R.

156—124, 126, 133, 165, 249, 412, 416.

UNITED STATES PATENT OFFICE
CERTIFICATE OF CORRECTION

Patent No. 3,502,525  March 24, 1970

John Oswald Wood

It is certified that error appears in the above identified patent and that said Letters Patent are hereby corrected as shown below:

Column 1, line 21, "and the reducing" should read -- and then reducing --. Column 3, line 7, "U.K. patent application No. 25,214/62" should read -- United States Patent No. 3,182,260 issued on June 8, 1965 --. Column 4, line 63, "to metallic surface" should read -- the mettalic surface --. Column 6, line 50, "contact" should read -- contract --. Column 7, line 69, "rubber" should read -- rubberized --.

Signed and sealed this 22nd day of September 1970.

(SEAL)
Attest:

Edward M. Fletcher, Jr.  WILLIAM E. SCHUYLER, JR.
Attesting Officer  Commissioner of Patents